United States Patent [19]

Burns et al.

[11] 4,420,258

[45] Dec. 13, 1983

[54] DUAL INPUT GYROSCOPE

[75] Inventors: William K. Burns; Scott C. Rashleigh, both of Alexandria, Va.

[73] Assignee: The United States of America as represented by the Secretary of the Navy, Washington, D.C.

[21] Appl. No.: 314,298

[22] Filed: Oct. 23, 1981

[51] Int. Cl.³ .......................... G01C 19/64; G01B 9/02
[52] U.S. Cl. ..................................................... 356/350
[58] Field of Search ......................................... 356/350

[56] References Cited

U.S. PATENT DOCUMENTS 4,274,742  6/1981  Lustig ................................. 356/350

Primary Examiner—Vincent P. McGraw
Attorney, Agent, or Firm—Robert F. Beers; William T. Ellis

[57] ABSTRACT

A fiber-optic gyroscope designed to operate at maximum sensitivity by supplying two equal-intensity input beams with a specific phase difference to the gyroscope optical coupler. When the coupler outputs into the gyroscope optical fiber coil are of equal intensity, reciprocity requires the gyroscope to operate at quadrature. This device is realized by splitting a laser beam into two paths with a phase shifter in one of the paths to control the phase shift and thereby the intensity of the beams, and coupling the light from these paths into a fiber optic coil via a four-port 3dB coupler.

15 Claims, 8 Drawing Figures

DUAL INPUT GYROSCOPE

BACKGROUND OF THE INVENTION

The present invention relates generally to devices responsive to angular motion or rotation, and more particularly to a Sagnac interferometer for measuring the angular rate of rotation of a platform.

Rotation rate sensors are utilized in a variety of different applications including use as a rate gyroscope and a gyroscope test turn table, as well as application to tachometers for generator speed control, inertial navigation and non-magnetic compasses. In its most common application, the device is disposed in a gimbal mounting and used in the manner of a gyroscope, stabilized about one sensitive axis or about two or three mutually perpendicular sensitive axes. The device so mounted may provide a space platform stabilized with respect to the system of fixed stars and may be used either for visual aid in navigation or to supply information for actuating automatic piloting or navigating mechanisms.

It has been known for some time that the Sagnac interferometer can be used to detect the rotation rate of any rotating frame, and thus can be used as a gyroscope. The Sagnac interferometer is based on the existence of the measurable phase shifting effect of angular motion upon the transmission and subsequent interference of counterpropagating electromagnetic waves in a light circuit loop path disposed in the plane of the angular motion.

Referring to FIG. 1, there is shown a typical prior art Sagnac interferometer. The assembly of FIG. 1 is mounted on a platform and is designed to sense the rotation rate of that platform. A beam of light, in this case a laser beam from a laser source 10, is split by a beamsplitter 12 into two beams diverging at different angles to each other. These two beams are then focused by means of the lenses 14 and 16 into the ends of a helically wound single mode optical fiber coil 18. The light focused by the lens 14 traverses the optical fiber 18 in a clockwise direction, while the light focused by the lens 16 traverses the light path circuit 18 in a counter-clockwise direction. When these two counter propagating optical beams have traversed in their respective directions through the light path circuit 18, they will again impinge upon the beamsplitter 12 and will interfere with each other. This light interference will form a fringe or interference pattern. As the platform on which the optical fiber coil 18 is rotated, there will be a measurable intensity change in the light interference pattern obtained from the beamsplitter 12. This measurable change in intensity is due to the relative phase shift between the light propagating in the clockwise direction and the counter-clockwise direction in the optical fiber coil 18 due to rotation. This change in intensity is proportional to the phase shift between the two counterpropagating optical beams which, in turn, is proportional to the rotation rate in the plane of the optical fiber coil 18. Thus, it is possible to measure the rotation rate by measuring the optical intensity of either or both of the interference pattern outputs from the optical beamsplitter 12. To this end, a photodetector 20 is disposed to detect the interference pattern component 19 and thus to measure the intensity $I_3$. Likewise, the interference pattern component 21 is directed by the beamsplitter 12 to a second beamsplitter 22 which directs a portion thereof to a photodetector 24 to measure intensity $I_4$.

It is well known that the phase shift between the counterpropagating optical beams and thus the intensities $I_3$ and $I_4$ in the optical fiber coil 18 vary sinosoidally with the variation of the rotation rate of the plane in which the fiber optic coil rests. This variation of the intensities $I_3$ measured at the photo-detector 20 and $I_4$ measured at the photodetector 24 caused by the phase shift variation is plotted in FIG. 2 versus the rotation rate of the optical fiber coil platform. It can be seen that the optical intensities $I_3$ and $I_4$ are 180 degrees out of phase.

A particular problem with the Sagnac interferometer is that the sensitivity of the device is directly proportional to the slope or derivative of the interferometer output intensities $I_3$ and $I_4$. Accordingly, as can be seen from FIG. 2, the sensitivity of the device will vary from zero to a maximum as the slope or the derivative of the interferometer output intensities varies from zero to a maximum. It can also be seen that the maximum sensitivity point 30 is at the quadrature or 90 degree phase shift differential point. Likewise, the sensitivity approaches zero as the rotation rate approaches zero. This can be understood mathematically by noting that the detected intensity is proportional to $\cos^2 \phi$, where $2\phi = 8NA\Omega/\lambda c$, $\Omega$ is the Sagnac phase shift, NA is the total area enclosed by the fiber, and $\lambda$ and c are the free-space wavelength and light velocity respectively.

Accordingly, it can be seen that the location of this minimum sensitivity point at the zero rotation rate causes a special problem for navigational applications where the detected rotation rate is very small.

As noted above, in order to obtain a high sensitivity at low rotation rates, the Sagnac interferometer must be operated at its maximum sensitivity or the quadrature point. Accordingly, it is necessary to introduce a non-reciprocal phase bias of $\pi/2$ between the counterpropagating beams via some external means. Such a $\pi/2$ phase shift will make the detected intensity proportional to $\sin 2\phi \approx 2\phi$ for small rotation rates. Such a non-reciprocal phase shift may be introduced by applying a magnetic field to a portion of the fiber in the interferometer to induce a phase change via the magneto-optic Faraday effect. However, such a Faraday effect phase shifter requires large electrical currents. Additionally, a Faraday effect phase shifter only introduces non-reciprocal phase shift to light which is circularly polarized. Thus, this device would require an additional set of optical elements (quarter wave plates) to convert the linearly polarized signal to circular polarization, and then back again. Moreover, such Faraday effect phase shifters are bulky devices and are difficult to maintain at the 90 degree phase shift point because of temperature drift problems.

A non-reciprocal phase shift could also be introduced by an electrooptic phase shifter. However, such an electrooptic device must be operated on a pulsed basis. Since such pulsed phase shift operation will have a transit time in the microsecond range, it is difficult to obtain a system to operate quickly enough. It should also be noted, both with respect to the electrooptic phase shifter and the Faraday effect phase shifter, that the introduction of such additional elements into the fiber optic path can cause increased interferometer noise due to reflections and increased susceptibility to external perturbation effects.

Accordingly, it can be seen from the above that it would be highly desirable to introduce a phase shift in a reciprocal fashion to thereby eliminate the problems attendant to the use of Faraday cells and time-varying electrooptic devices.

OBJECTS OF THE INVENTION

Thus, it is an object of the present invention to provide an externally controlled phase shift to a Sagnac interferometer which is reciprocal in nature.

It is a further object of the present invention to permit the operation of a Sagnac interferometer at its quadrature point using a reciprocal phase shift to thereby eliminate insertions into the path of the fiber optic coil.

It is yet a further object of the present invention to eliminate the requirement for the use of either Faraday cells or time-varying electrooptic devices to effect the operation of a Sagnac interferometer at its quadrature point.

Other objects, advantages and novel features of the invention will become apparent from the following detailed description of the invention when considered in conjunction with the accompanying drawings wherein.

SUMMARY OF THE INVENTION

Briefly, the above and other objects are realized by coupling two equal intensity inputs with a particular phase difference therebetween into a Sagnac interferometer to force the device to operate reciprocally when at rest thereby providing maximum sensitivity operation upon rotation. This device may be realized in one embodiment by applying different equal intensity light beams to the input ports of a 3 dB coupler or a beamsplitter connected to the ends of a light path circuit, such as, by way of example, a fiber optic coil. The equal intensity beams may be obtained by splitting a source beam into two components and directing these beams along separate light paths to separate input ports of the 3 dB coupler or beamsplitter for the light path circuit. A phase shifting element should be disposed in one or both of the light paths in order to make phase adjustments to insure that the intensities remain equal after coupling through the 3 dB coupler.

DETAILED DESCRIPTION OF THE PREFERRED EMBODIMENT

Figure 1:
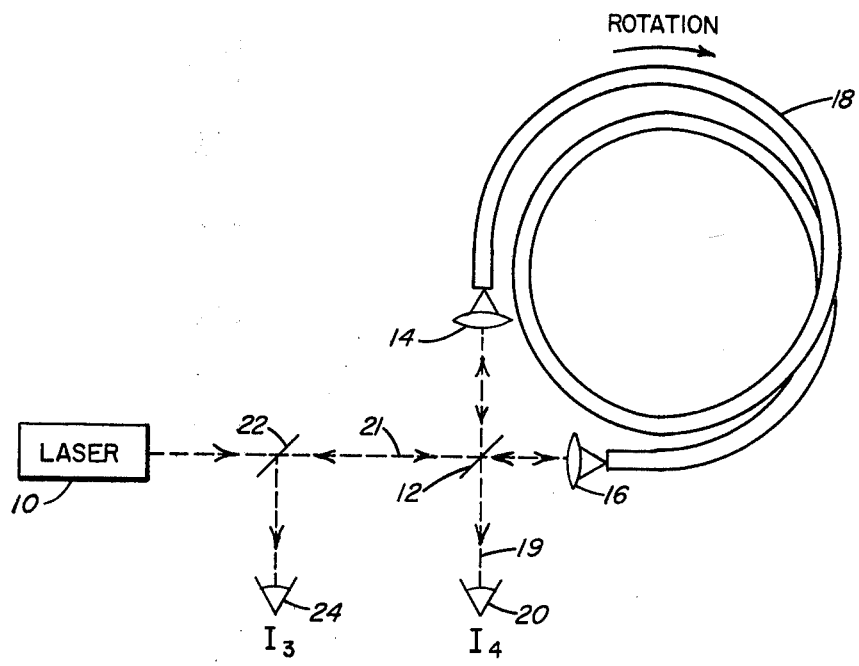
FIG. 1 is a representation of a typical prior art Sagnac interferometer.
Figure 2:
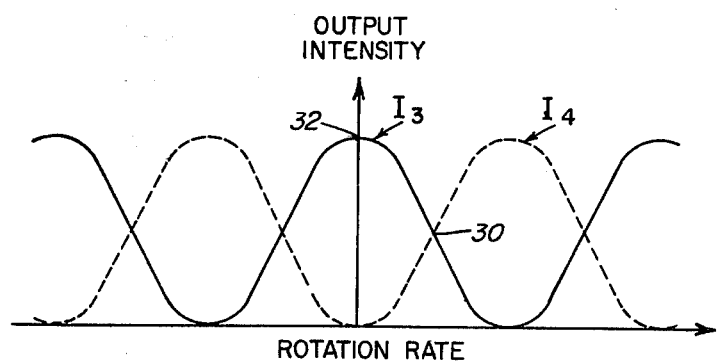
FIG. 2 is a plot of the output intensities $I_3$ and $I_4$ from FIG. 1 versus the rotation rate.
Figure 3:
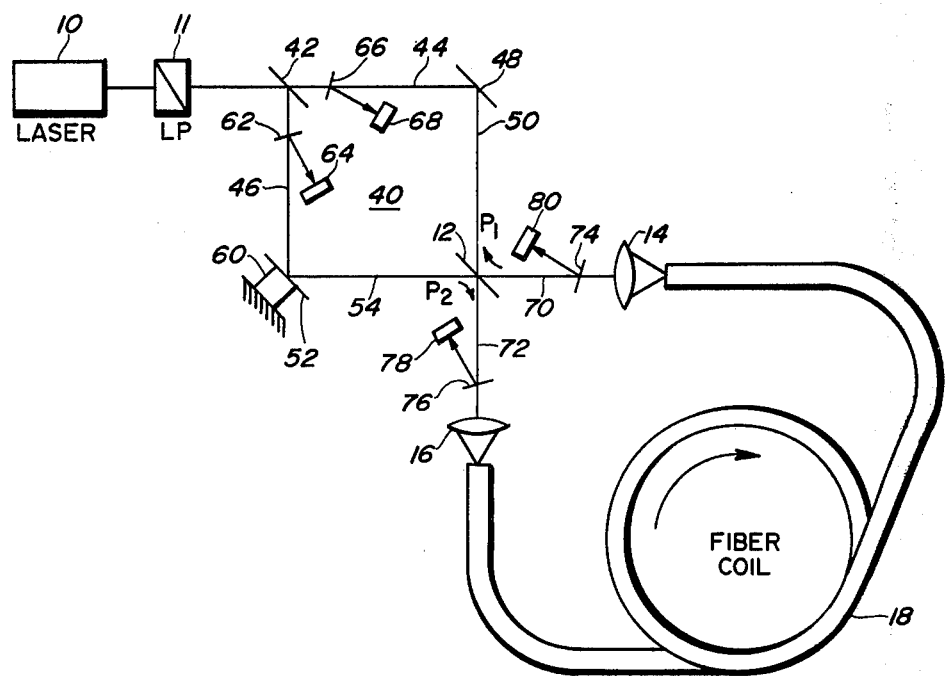
FIG. 3 is a diagrammatic representation of the Sagnac interferometer of the present invention.

In essence, the present invention is directed to a new method for achieving operation of a gyroscope at the maximum sensitivity point. Applicants have recognized that at the quadrature point of operation (the point of maximum sensitivity) the two outputs from the gyroscope have equal intensity. Accordingly, Applicants have designed a system for supplying two inputs to a gyroscope of equal intensity with a particular phase difference therebetween, thereby forcing the gyroscope to act reciprocally when at rest, thus automatically causing the gyroscope to be at quadrature when rotated. In essence, since the fiber loop for the Sagnac interferometer interchanges the beamsplitter outputs and reintroduces the outputs back into the beamsplitter while maintaining (at rest) the phase difference between them, reciprocal operation will be achieved when the beamsplitter outputs have equal intensities. In the present case, equal intensity beamsplitter outputs have been achieved utilizing a symmetric design and by adjusting the phase difference between the inputs. A Mach-Zehnder interferometer placed at the input to the Sagnac fiber ring is a convenient method of achieving the necessary conditions for obtaining equal intensity beamsplitter outputs. FIG. 3 discloses one embodiment of the present invention wherein the Mach-Zehnder interferometer or double coupler system is realized in air with beamsplitter and mirrors. It is to be understood, of course, that the system is not limited to an air configuration, but may be realized by a wide variety of 3 dB coupler configurations.

Referring specifically to the drawing, wherein like reference characters designate like or corresponding parts throughout the views, there is shown an optical input light source 10 which may be realized, by way of example, by a Spectra-Physics Model 120 He-Ne Laser. The system includes an optical light path circuit 18 with a plurality of turns of optical path in or parallel to a given plane and a Mach-Zehnder interferometer 40 dispossed at the input to the optical light path circuit 18 and operable to split light from the optical source 10 into two beams and to couple these beams into the optical light path circuit such that two equal-intensity beams counterpropagate through the optical light path circuit. The Mach-Zehnder interferometer comprises, in the embodiment disclosed in FIG. 3, a first coupler or beamsplitter 42 disposed to split the light signal from the optical source 10 into two beams following the paths 44 and 46 which diverge at right angles to each other. The Mach-Zehnder interferometer 40 also includes mirrors 48 and 52 and the coupler or beamsplitter 12. Light propagating from the beamsplitter 42 on the path 44 is reflected by the mirror 48 which is disposed at, by way of example, a 45 degree angle to the light path 44. The reflected beam from mirror 48 is directed along the lightpath 50 to one side or input port of the beamsplitter 12. Likewise, the light beam on the path 46 from the beamsplitter 42 is reflected by the mirror 52 which is disposed at a 45 degree angle to the light path 46. The reflection from the mirror 52 is directed along path 54 to the other side or input port of the coupler or beamsplitter 12. The light paths 44 and 50 form a first light path, while the light paths 46 and 54 form a second light path. The light beams on the first and second optical paths are coupled by the coupler or beamsplitter 12 into the light path circuit 18. The coupler 12 will operate to direct a portion of the beams on the first and second optical paths into each end of the light path circuit 18 to counterpropagate therein. In other words, the coupler 12 operates to split the light from the first light path into a first and second beams and directs the first beam to travel in a clockwise direction around the light path circuit and directs the second beam to travel in a counter-clockwise direction around the light path circuit. Likewise, the coupler splits the light from the second light path into a third and a fourth beams and directs the third beam to travel in the clockwise direction around the light path circuit 18 and directs the fourth beam to travel in a counter-clockwise direction around the light path circuit 18. In the embodiment of FIG. 3 the light beams from the beamsplitter-coupler 12 to be directed into the light path circuit 18 are focused on the light path circuit ends by the lenses 14 and 16 in the light paths 70 and 72, respectively.

As noted above, in order to obtain operation of the device at the quadrature point for maximum sensitivity, the light beams applied to the ends of the light path circuit 18 must be of equal intensity. In order to cause these beams to be of equal intensity, an appropriate relative phase difference must be inserted between the light propagating in the first and second light paths. Such a relative phase shaft is typically accomplished by inserting means for providing a relative path length difference between the first and second light paths. In the embodiment of FIG. 3, this relative path length difference is realized by mounting the mirror 52 on a piezoelectric cylinder 60 which may be driven to adjust the location of the mirror 52 in the second light path. Accordingly, the second light path composed of the light path segments 46 and 54 may be varied in length thereby varying the phase of the light beam propagating therein relative to the light beam propagating in the first light path composed of the light path segments 44 and 50.

When the counterpropagating light beams in the light path circuit 18 have traversed through the light path circuit in their respective directions, they will be recombined by the coupler 12 into two separate interference light patterns propagating back through the light path segments 50 and 44 and 54 and 46, respectively. Beamsplitters 62 and 66 have been inserted in the light path segments 46 and 44, respectively, in order to pick off a small portion of the light propagating in those light path segments. The light picked off from the return beam on the light path segment 46 by the beamsplitter 62 is detected by a photodetector 64. Likewise, the light that is picked off by the beamsplitter 66 from the return beam on the light path segment 44 is detected by the photodetector 68. These photodetected signals from the photodetectors 64 and 68 are proportional to the rotation rate in the plane of the light path circuit 18. It should be noted that the location of the beamsplitters 62 and 66 in the Mach-Zehnder interferometer 40 is not critical except that the return signals propagating back on the first and second optical paths must be picked off prior to reaching the beamsplitter 42.

Two beamsplitters 74 and 76 may be disposed in the paths 70 and 72 in order to pick off a small portion of the light being directed into the ends of the light path circuit 18. The light picked off by the beamsplitter 74 is then detected by a detector 80 to yield $I_1$, while the light detected by the beamsplitter 76 is detected by the photodetector 78 to yield $I_2$. The resulting voltage signals from these two detectors may be compared and utilized to drive the piezoelectric cylinder to adjust the phase shift to cause the intensities of the light signal applied to the ends of the light path circuit to be equal.

Figure 4:
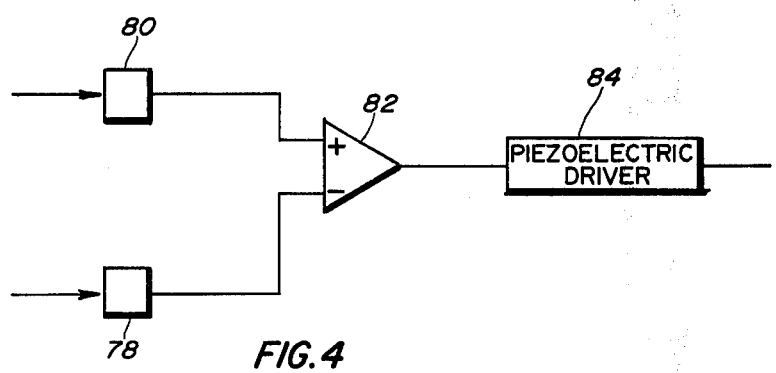
FIG. 4 is a circuit diagram of one embodiment of the feedback phase shifter control loop which may be utilized in the embodiment of FIG. 3.

In many embodiments of the present invention the adjustment of the phase shift in the second path could be done via a single measurement. Accordingly, such an adjustment could be done manually. However, in the present air-mirror design air currents will tend to change the path lengths in the interferometer. Accordingly, continuous adjustment of the phase shift will typically be necessary. In order to implement such a continuous adjustment of the phase shift, the circuit of FIG. 4 is set forth. The detectors 78 and 80 merely direct their voltage outputs to the inputs of a differential amplifier 82. The voltage output from this differential amplifier is then applied to control the piezoelectric driver 84 for the mirror 52. In this manner, the light intensities incident upon the ends of the light path circuit 18 are automatically adjusted to be equal and to remain so.

To describe the mathematical operation of the present embodiment, consider only a single polarization (for example, vertical), which is unchanged after propagation through the various beamsplitters. Assume that the beamsplitter 42 divides the incident light intensity equally. Then for unity input, the light intensities incident upon fiber ends of the light path circuit 18 can be written as $$I_1 = \tfrac{1}{2}|\rho_1|^2 + \tfrac{1}{2}|\tau|^2 + |\rho_1||\tau|\cos(\delta+\Psi_1) \quad (1)$$

and $$I_2 = \tfrac{1}{2}|\rho_2|^2 + \tfrac{1}{2}|\tau|^2 + |\rho_2||\tau|\cos(\delta-\Psi_2) \quad (2)$$

respectively, where $\delta$ is the phase difference between the light in the two arms of the Mach-Zehnder interferometer and $\rho_1$, $\rho_2$, and $\tau$ are the complex reflection and transmission coefficients, respectively, for the beamsplitter 12. The phases $\Psi_1 = \arg(\rho_1/\tau)$ and $\Psi_2 = \arg(\rho_2/\tau)$ describe the differences in phase between the reflected and transmitted light. For a lossless beamsplitter, $\Psi_1 + \Psi_2 = \pi$.

We require symmetry in beamsplitter 12 such that $|\rho_1| = |\rho_2| = |\rho|$, which reduces Eqs. (1) and (2) to $$I_{1,2} = \tfrac{1}{2} \pm |\rho||\tau|\cos\theta \quad (3)$$

where $\theta = \delta + \Psi_1$. Here, we have utilized $|\rho|^2 + |\tau|^2 = 1$. After propagating through the fiber coil, which rotates at angular velocity $\Omega$ the light intensities incident upon beamsplitters 62 and 66 are $$I_{3,4} = \tfrac{1}{2} \pm 2|\rho||\tau|(|\tau|^2\cos(\phi-\theta) - |\rho|^2\cos(\phi+\theta))\cos\phi \quad (4)$$

respectively. We have assumed zero fiber loss and maintenance of the state of polarization (SOP) in the fiber. Equation (4) demonstrates reciprocal operation of the gyroscope for the conditions $\phi - 0$ and $\theta = \pi/2$. For $\phi \neq 0$, maximum sensitivity will be achieved when $\rho = |\tau| = 1/\sqrt{2}$ Equations (3) and (4) then become $$I_{1,2} = \tfrac{1}{2}(1 \pm \cos\theta) \quad (5)$$

and $$I_{3,4} = \tfrac{1}{2}(1 \pm \sin\theta \sin 2\phi). \quad (6)$$

Operationally we adjust the value of $\theta$ (through $\delta$) such that $I_1 = I_2$. The Sagnac interferometer is then automatically at quadrature.

In essence, the input circuit 40 with its beamsplitter coupler 42 which divides a light beam into two separate beams propagating on the two optical paths 44-50 and 46-54 respectively, and beamsplitter 12 for recombining the beams propagating in the two optical paths, can be viewed as a Mach-Zehnder interferometer. In operation, this Mach-Zehnder interferometer provides two equal intensity inputs for counterpropagation through the light path circuit 18. These equal intensity inputs are obtained by adjusting the relative phase difference between the light beams propagating in the two optical paths.

In the embodiment of FIG. 3 actually constructed by Applicants, the Mach-Zehnder interferometer was constructed with discreet components. The beamsplitter 12 divided the incident light into a ratio of 1.03:1 for one direction and 1.01:1 for the other direction. The fringe visibility was limited to approximately 75% because of distortion of the beam by the beamsplitters and because of the slightly unequal splitting by the beamsplitter 12. The light path circuit 18 was implemented by 84 meters of ITT single-mode fiber, which was wound in seventy turns on a drum with a thirty-eight cm diameter. The fiber ends for the fiber coil were beveled to remove disturbing reflections. Bi refringences in the fiber coil were found to change the SOP from vertical. Therefore, one end of the fiber coil was placed in a fiber squeezer (see M. Johnson, Appl. Optics 18, 1288 (1979)) to allow adjustment of the SOP to be vertical at both fiber ends. The fiber coil was insulated to prevent fast environmentally induced changes in the SOP. The voltage in the present embodiment applied to the piezoelectric cylinder 60 was limited to approximately ±300 V, which gave an adjustable range of approximately ±2 fringes ($\delta \sim \pm 4\pi$ radians). A linear polarizer 11 was used to ensure that just one polarization propagated in the system.

Figure 5:
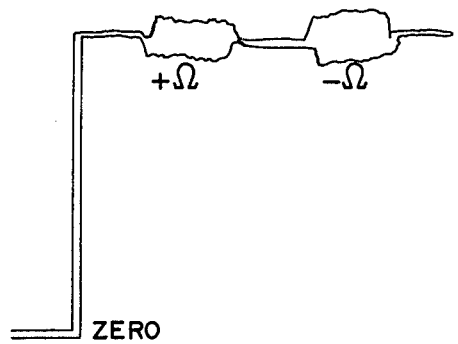
FIG. 5 is a plot of the outputs $I_3$ and $I_4$ from the embodiment of FIG. 3 for a rotation of 3 degrees/second.

The voltage signals from the photodetectors 64 and 68 as the gyroscope system of FIG. 3 is rotated at approximately ±4 degrees/seconds is shown in FIG. 5. The variation of the signals during rotation is thought to be due to the non-uniform manual rotation employed. For the above rotation rate, 2 $\phi$=4.2 degrees, and thus equation (6) predicts a change in the detect intensity of 7.4%, which is in agreement with the measured change of approximately 6.8%. Thus, the measured gyroscope sensitivity is approximately 0.93 rad-1, which is very close to the theoretical maximum sensitivity of 1 rad-1, indicating operation very close to the quadrature condition. The detected signals show the expected dependence on the direction of rotation. By comparison, when one arm of the Mach-Zehnder interferometer was interrupted, no rotation-dependent signal could be detected for this rotation rate as the gyroscope was operating at null sensitivity.

Figure 6:
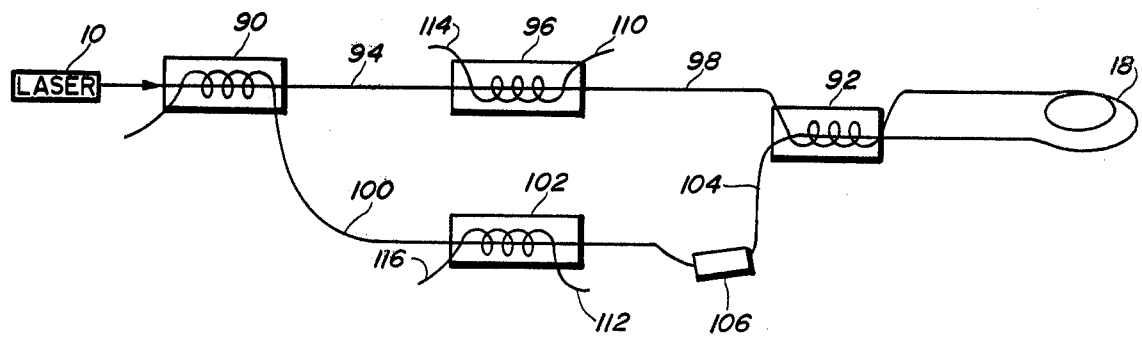
FIG. 6 is a schematic layout of an embodiment of the present dual-input Sagnac interferometer utilizing bottle couplers.

FIG. 6 discloses in schematic form the dual-input gyroscope of the present invention utilizing fiber bottle couplers 90 and 92 for the couplers or beamsplitters 42 and 12, respectively of FIG. 3. A detailed description of such bottle couplers may be found in the article "Single Mode Fiber Optic Power Divider: Encapsulated Etching Technique" by Sheem and Giallorenzi, Optics Letters, Jan 1979, p. 29. The first and second optical paths are formed in this embodiment by optical waveguides. More specifically, the first path is composed of the optical fiber segments 94 and 98 and the second optical path is composed of the optical fiber segments 100 and 104. The optical beams on the light paths 98 and 104 are coupled through the bottle coupler 92 to the light path circuit 18, which may again be implemented via a fiber optic coil. The bottle couplers 96 and 102 are disposed in the first and second optical paths, respectively in order to monitor the input beams being applied via the lines 98 and 104 to the coupler 92, and also to monitor the interference pattern intensities of the return beams after having propagated through the fiber coil 18. In particular, the intensities of the input beams are monitored at the ends 110 and 112 for the couplers 96 and 102, respectively Likewise, the interference beam intensities for the return beams are monitored at the ends 114 and 116 of the couplers 96 and 102, respectively. The phase shift function in the second optical path may be realized by a piezoelectric stretcher attached to the optical fiber segment 104. For this embodiment, the phase shift $\Delta\phi = \pi/2$ in order to obtain equal intensity optical beams into the light path circuit 18. It should be noted, that this configuration provides a minimum of reflecting surfaces in the device, thereby significantly reducing the noise level in the device.

Figure 7:
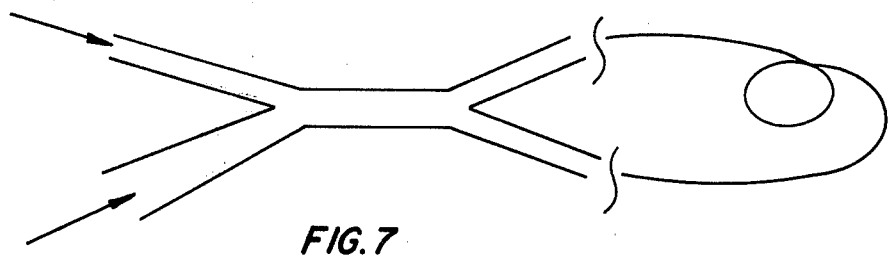
FIG. 7 is a schematic diagram of a modal evolution 3 dB coupler which may be utilized as a component in the present invention.

It should also be noted that there are a variety of 3 dB couplers available which may be utilized to realize the beamsplitter/coupler connected to the input of the light path circuit 18 (12 in FIG. 3 and 92 in FIG. 5). For example, a modal evolution 3 dB coupler of the type shown in FIG. 7 may be utilized. Such a modal coupler is described in the article by Burns, "Optical Modal Evolution 3 dB Coupler", Applied Optics, Vol. 15, p. 1053, April 1976. The appropriate $\Delta\phi$ for such a modal evaluation coupler is $\pi/2$ in order to ensure that the gyroscope has equal intensity inputs thereto.

Figure 8:
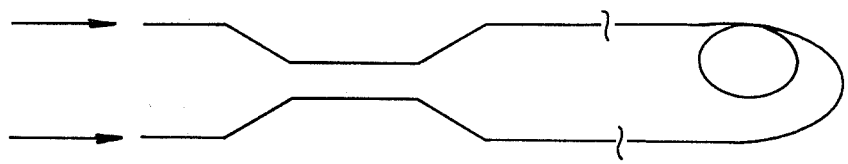
FIG. 8 is a schematic layout of a 3 dB bottle coupler or integrated optical coupler which may be utilized as a component in the present invention.

Likewise, an integrated optics coupler represented by the diagram of FIG. 8 could be utilized as the input coupler to the light path circuit 18. For such a coupler $\Delta\phi = 0, \pi$. These same values for $\Delta\phi$ may also be used for the bottle coupler. It should also be noted that the entire Mach-Zehnder interferometer configuration could be implemented by integrated optics.

The noise level is of particular importance in any fiber-optic gyroscope. Electronic processing of the detected signals in the form $S = (I_3 - I_4)/(I_3 + I_4) = \sin 2\phi$ should remove the dependence of the gyroscope signal on laser power fluctuations.

In essence, Applicants have demonstrated a new approach to the problem of operating fiber gyroscopes in quadrature. By utilizing the principle of reciprocity, the requirement for a non-reciprocal phase shift has been replaced by a requirement for a reciprocal phase shift. The necessary dual-inputs required to effect this change are provided by the substitution of a Mach-Zehnder interferometer for the single 3 dB coupler used in prior art gyroscopes. It should be noted that the required phase shift $\Delta\phi$ is typically of constant magnitude unless perturbations are introduced in the light paths.

Obviously many modifications and variations of the present invention are possible in light of the above teachings. It is therefore to be understood that within the scope of the appended claims the invention may be practiced otherwise than as specifically described.

We claim:

1. A Sagnac rotation measurement device designed to operate in a reciprocal mode for maximum sensitivity comprising:

an interferometer including a 3 dB coupler with two input ports and two output ports and a light path circuit with a plurality of turns of optical path in or parallel to a given plane and with the ends of the circuit connected between said two outputs ports of said 3 dB coupler, means for applying different equal intensity light beams to each of said two input ports of said 3 dB coupler in appropriate phase relationship so that the light beams applied from each of said output ports into said light path circuit ends for counter-propagation therethrough have equal intensities; and means for extracting output light signals returning from said light path circuit having information regarding the rotation rate of said plane of said light path circuit from the input ports of said 3 dB coupler.

2. A rotation measurement device as defined in claim 1, wherein said different light beam applying means comprises:

optical input means;

a first light path connected at one end to one of the two input ports of said 3 dB coupler, a second light path connected at one end to the other of said two input ports of said 3 dB coupler, means for generating two equal intensity beams in response to light from said optical input means and directing one of said two beams into said first light path toward its 3 dB coupler connection and directing the other of said two beams into said second light path toward its 3 dB coupler connection; and means for providing a relative path length difference between said first and second light paths to cause a relative phase difference therebetween to permit the adjustment of the intensities of the light beams applied into the light path circuit ends through said 3 dB coupler so that they are equal.

3. A rotation measurement device as defined in claim 2, wherein said 3 dB coupler is an integrated optical coupler.

4. A rotation measurement device as defined in claim 2, wherein said 3 dB coupler is a modal evolution 3 dB coupler.

5. A rotation measurement device as defined in claim 2, wherein said 3 dB coupler is a 3 dB bottle coupler.

6. A rotation measuremet device as defined in claim 2, wherein said signal extracting means comprises a set of beamsplitters disposed in said first and second light paths for extracting a portion of the output light signals propagating from said 3 dB coupler input ports.

7. A rotation measurement device as defined in claim 6, wherein said optical length changing means includes:

a phase shifter disposed in said second light path;

means for picking off a portion of the light signals applied into each of the ends of said light path circuit from said two output ports of said 3 dB coupler; and means for comparing these signals and generating a control voltage therefrom proportional to the difference in intensities thereof and applying this signal to control said phase shifter.

8. A rotation measurement device as defined in claim 7, wherein said light path circuit comprises a optical fiber coil.

9. A Sagnac rotation measurement device designed to operate in a reciprocal mode for maximum sensitivity comprising:

optical input means;
a first light path;
a second light path;

means for generating two equal intensity beams in response to the light from said optical input means and directing one of said two beams to propagate in said first light path and the other of said beams to propagate in said second light path;

means for providing a relative optical path length difference between said first and second light paths to effect a relative phase difference in the light propagating therein;

a light path circuit having a plurality of turns in or parallel to a given plane;

means for coupling the light from said first light path into a first and second beams and directing said first beam to travel in a clockwise direction around said light path circuit and directing said second beam to travel in a counterclockwise direction around said light path circuit and for coupling the phase shifted light from said second light path into a third and fourth beams and directing said third beam to travel in a clockwise direction around said light path circuit and directing said fourth beam to travel in a counterclockwise direction around said light path circuit, and for recombining these light beams after having traversed through their respective directions in said light path circuit to produce interference output light beams on each of said first and second paths; and means for extracting from the interference output light beams propagating back along said first and second light paths from said coupling means an output signal having information regarding the rotation rate in said plane of said light path circuit; wherein said optical path length difference means is adjusted to cause the total light beam intensity applied in each direction through said light path circuit to be equal to thereby cause reciprocal operation of the device.

10. A rotation measurement device as defined in claim 9, wherein said optical length changing means comprises:

a phase shifter disposed in said second light path;

means for picking off a portion of the light signals applied into said light path circuit in the clockwise direction and a portion of the light signals applied into said light path circuit in the counterclockwise direction; and means for comparing these picked-off signals and generating a control voltage therefrom proportional to the difference in intensities thereof and applying this signal to control said phase shifter.

11. A Sagnac rotation measurement device designed to operate in a reciprocal mode for maximum sensitivity comprising:

an optical input means;

a first 3 dB coupler for splitting the light from said optical input means into two equal intensity beams;

a second 3 dB coupler having two input ports and two output ports;

a first optical path connected between said first and second 3 dB couplers for conducting one of said equal intensity beams to one input port of said second 3 dB coupler;

a second optical path connected between said first and second 3 dB couplers for conducting the other of said equal intensity beams to the other input port of said second 3 dB coupler;

a light path circuit having a plurality of turns therein in or parallel to a given plane with its ends connected to said two output ports of said second 3 dB coupler;

means for causing a relative phase shift between the light propagating in said first and second optical paths by an appropriate amount so that the light beams applied from each of said output ports of said second 3 dB coupler into said light circuit ends are equal in intensity; and means for extracting from the light signals propagating from the input ports of said second 3 dB coupler back through said first and second optical paths an output signal having information regarding the rotation rate in said plane of said light path circuit.

12. A rotation measurement device as defined in claim 11, wherein said phase shifter means comprises:

a phase shifter disposed in said second light path;

means for picking off a portion of the light signals applied into said light path circuit from said output ports of said second 3 dB coupler; and means for comparing these signals and generating a control voltage therefrom proportional to the difference in intensities thereof and applying this signal to control said phase shifter.

13. A Sagnac rotation measurement device designed to operate in a reciprocal mode for maximum sensitivity comprising:

an optical source;

a Sagnac optical fiber ring disposed in a given plane with an input thereto; and a Mach-Zehnder interferometer disposed at the input to said Sagnac optical fiber ring and operable to split light from said optical source into two beams and to couple these beams into said optical fiber ring in the proper phase relationship such that two equal-intensity beams counterpropagate through said optical fiber ring.

14. A rotation measurement device as defined in claim 13, wherein said Mach-Zehnder interferometer includes means for splitting the light from said optical source and directing it along two optical paths and further includes means for causing a relative phase shift between the light propagating in said two optical paths to permit a relative phase adjustment.

15. A rotation measurement device as defined in claim 14, wherein phase shifting means comprises:

a phase shifter disposed in said second light path;

means for picking off a portion of the counterpropagating light signals coupled into said optical fiber ring from said Mach-Zehnder interferometer; and means for comparing these signals and generating a control voltage therefrom proportional to the difference in intensities thereof and applying this signal to control said phase shifter.

* * * * *